US008049754B2

(12) United States Patent
Gilbert

(10) Patent No.: US 8,049,754 B2
(45) Date of Patent: Nov. 1, 2011

(54) MULTIPLE SOURCE WAVEFORM DRAWING SYSTEM AND METHOD

(75) Inventor: Harry Gilbert, Portage, MI (US)

(73) Assignee: SPX Corporation, Charlotte, NC (US)

( * ) Notice: Subject to any disclaimer, the term of this patent is extended or adjusted under 35 U.S.C. 154(b) by 944 days.

(21) Appl. No.: 11/955,709

(22) Filed: Dec. 13, 2007

(65) Prior Publication Data

US 2009/0153560 A1 Jun. 18, 2009

(51) Int. Cl.
*G06T 11/20* (2006.01)
(52) U.S. Cl. .................................................. 345/441
(58) Field of Classification Search .................. 345/441
See application file for complete search history.

(56) References Cited

U.S. PATENT DOCUMENTS

| | | | | |
|---|---|---|---|---|
| 7,079,143 | B2 * | 7/2006 | Gilbert | 345/441 |
| 2004/0080511 | A1 * | 4/2004 | Gilbert | 345/441 |
| 2005/0225257 | A1 * | 10/2005 | Green | 315/209 R |
| 2008/0018268 | A1 * | 1/2008 | Green | 315/308 |
| 2009/0079741 | A1 * | 3/2009 | Gilbert | 345/441 |
| 2009/0153560 | A1 * | 6/2009 | Gilbert | 345/441 |

OTHER PUBLICATIONS

IEEE Xplore—Eclipsing effects with high-duty-factor waveforms in by ER Billam—1985—by E.R. Billam.*
Design of a Space-Based Radar Signal Processor—Aerospace and by TJ Nohara—1996.*
U.S. Appl. No. 11/858,660, filed Sep. 20, 2007, Gilbert.

* cited by examiner

*Primary Examiner* — Javid Amini
(74) *Attorney, Agent, or Firm* — Baker & Hostetler LLP

(57) ABSTRACT

A method of waveform drawing, including generating a plurality of waveforms with certain waveforms being in the same space in a display, eclipsing the waveforms in a rank order and storing the related data in an eclipsed list, the related data of the eclipsed list including a plurality of drawing points with the results of eclipsing the waveforms in the rank order, performing a reduction of flicker on a displayed image from the data outputted from the eclipsing of the waveforms in rank order, an erasure list and a draw list including the results of the reduction of flicker, optimizing the erasure list from the data outputted from performing the reduction of flicker and storing in an optimized erasure list, and copying from the eclipsed list to a predecessor list, the predecessor list including drawing units representing vertical stripes at a given x-axis position.

1 Claim, 9 Drawing Sheets

MULTIPLE SOURCE WAVEFORM DRAWING SYSTEM AND METHOD

CROSS-REFERENCE TO RELATED APPLICATIONS

This application cross-references earlier filed application of STATISTICAL WAVEFORM DRAWING ROUTINE filed at the United States Patent and Trademark Office on Sep. 20, 2007, with application Ser. No. 11/858,660, which is hereby incorporated by reference in its entirety.

FIELD OF THE INVENTION

The present invention relates generally to waveform animation. More particularly, the present invention relates to a system and technique for implementation of a multiple source waveform drawing routine.

BACKGROUND OF THE INVENTION

Digital waveform drawing is a technique that is utilized to display data, for example measurements related to the performance of a system, over a period of time. The technique involves digitally plotting pixels, which correspond to the data, in a waveform on a screen of a display.

It is often desirable to continuously display data received over several periods of time. However, the screen of the display is limited in size and after a waveform has been displayed for a certain period of time, the waveform has to be replaced to reflect the data received from a subsequent period of time.

Software programs are utilized to determine which pixels should be digitally plotted, such that the data appears on the screen of a display as part of a continuous waveform. However, processors, which perform the numerous, complex and involved logical and arithmetic operations required by the software programs to determine what pixels should be plotted, tend to operate significantly faster than the display screen can respond. The difference in speed between the processor and the response rate of the display may cause screen flicker to occur.

Screen flicker refers to the phenomenon that occurs whereby the screen of a display appears to flicker during the process of erasing an existing waveform on the screen and drawing the next waveform on the display screen.

One conventional method of waveform drawing involves creating a blank display area by erasing either the image on the screen or the full display screen, and drawing the next image to be displayed. A technique referred to as page flipping or background display buffering is sometimes utilized to reduce screen flicker. Page flipping involves storing the image being processed in a buffer while the waveform on the display is being shown, and displaying the next waveform from the buffer after it has been fully created.

However, independent of whether the conventional method of waveform drawing is employed alone, or in conjunction with page flipping, the process of creating a blank display area can slow down animation operations, and result in redundant plotting of pixels.

U.S. Pat. No. 7,079,143 for a Waveform Drawing System and Method by Harry M. Gilbert, the disclosure of which is hereby incorporated by reference in its entirety, includes a waveform routine that includes receiving an array of predecessor image data points.

When a number of waveforms are drawn on the same space, redundant drawing steps are made and also additional erasing steps are included in order to show the waveforms in the same space. Such problems exist because when multiple waveforms share the same space, there are overlaps of the drawing and erasing of one waveform over another. There is also a problem of sorting out the precedence of one waveform over another which may lead to an inaccurate display. Further, the problem of precedence also leads to additional and inaccurate erasing and drawing steps.

Accordingly, it would be desirable to provide a technique of waveform drawing that will avoid the problems of drawing a plurality of waveforms in the same space without redundant steps. Further, it would desirable to have such a technique without significant number of complex logical and arithmetic operations when a plurality of waveforms uses the same space.

SUMMARY OF THE INVENTION

The foregoing needs are met, to a great extent, by the present invention, wherein in one aspect an apparatus is provided that in some embodiments, the invention optimizes the drawing of multiple waveforms in the same display area.

Accordingly, the invention provides a method of waveform drawing that may avoid the redundant plotting of pixels, and increase the speed of animation operations, when a plurality of waveforms occupy the same space. The invention also provides a method of waveform drawing that may avoid a significant number of complex logical and arithmetic operations. The invention also provides multiple waveforms in the same display area.

In accordance with one aspect of the invention, a method of waveform drawing, includes generating a plurality of waveforms with certain waveforms being in the same space for display, eclipsing the waveforms in a rank order and storing in an eclipsed list, the eclipsed list including a plurality of drawing points with the results of eclipsing the waveforms in the rank order, performing a method of reducing flicker on the displayed image from the data outputted from the eclipsing of the waveforms in rank order, optimizing an erasure list from the data outputted from performing the method of reducing flicker, the erasure list and a draw list including the results of the method of reducing flicker, and copying from the eclipsed list to a predecessor list, the predecessor list including drawing units representing vertical stripes at a given x-axis position.

The eclipsing of the waveforms in the rank order, can include copying successor waveform drawing units to the eclipsed list, the successor drawing units including the newly arrived drawing request. The eclipsing the waveforms in the rank order, can further include for drawing units of each rank, and proceeding from the highest to the next lowest, when the higher ranked waveform intersects with a lower waveform, a conversion is made according to the rank. The eclipsing the waveforms in the rank order, can further include removing the lower ranked waveform from the eclipsed list. The eclipsing the waveforms in the rank order, can further include new drawing units produced by the conversion made according to the rank is added to the eclipsed list.

The optimizing of the erasure list can include copying drawing units from the erasure list to an optimized erase list, the optimized erase list including data where no erasure operates on any points contained in the draw list. The optimizing of the erasure list can further include comparing for each drawing unit from the draw list against the drawing unit form the erasure list. The optimizing of the erasure list can further include when drawing units from the erasure list intersect drawing units from the drawing list, converting the entry in the erasure list to a new entry. The optimizing of the erasure list can further include removing the original entry in the erasure list when the conversion of the erasure list is made. The optimizing of the erasure list can further include entering new drawing units of the erasure list are added when the conversion of the erasure list is made.

The optimization can be formed on a successor list, the successor list including a list of drawing units including the newly arrived drawing request. The optimization can also be performed on the erasure list itself.

In another embodiment of the invention, the method of waveform drawing in a displayed image, includes copying from the eclipsed list to a predecessor list, the predecessor list including drawing units representing vertical stripes at a given x-axis position after performing the method of reducing flicker, and optimizing an erasure list from the data outputted from performing the method of reducing flicker, the erasure list and a draw list including the results of the method of reducing flicker. The method of the waveform drawing can be executable in a computer readable media.

Another embodiment of the invention includes an apparatus of waveform drawing, including a means for generating a plurality of waveforms with certain waveforms being in the same space for display, a means for eclipsing the waveforms in a rank order and storing in an eclipsed list, the eclipsed list including a plurality of drawing points with the results of eclipsing the waveforms in the rank order, a means for performing a method of reducing flicker on the displayed image from the data outputted from the eclipsing of the waveforms in rank order, a means for optimizing an erasure list from the data outputted from performing the method of reducing flicker, the erasure list and a draw list including the results of the method of reducing flicker, and a means for copying from the eclipsed list to a predecessor list, the predecessor list including drawing units representing vertical stripes at a given x-axis position.

The means for eclipsing the waveforms in the rank order, can also include a means for copying successor waveform drawing units to the eclipsed list, the successor drawing units including the newly arrived drawing request, and a means for converting the drawing units according to the rank, for drawing units of each rank, and proceeding from the highest to the next lowest, when the higher ranked waveform intersects with a lower waveform.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
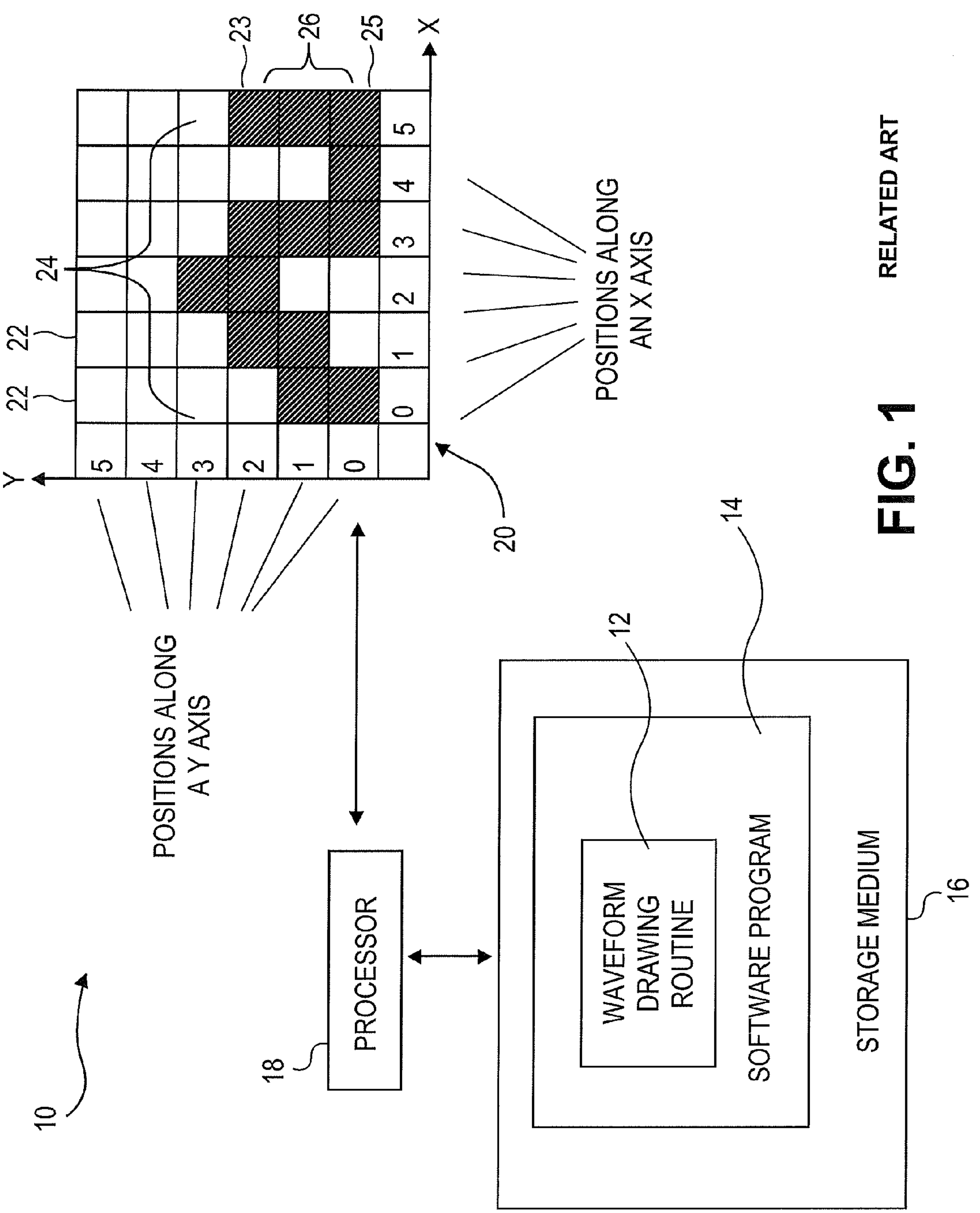
FIG. 1 RELATED ART
FIG. 1 is a block diagram of a system for waveform drawing in accordance with the invention.
Figure 2:
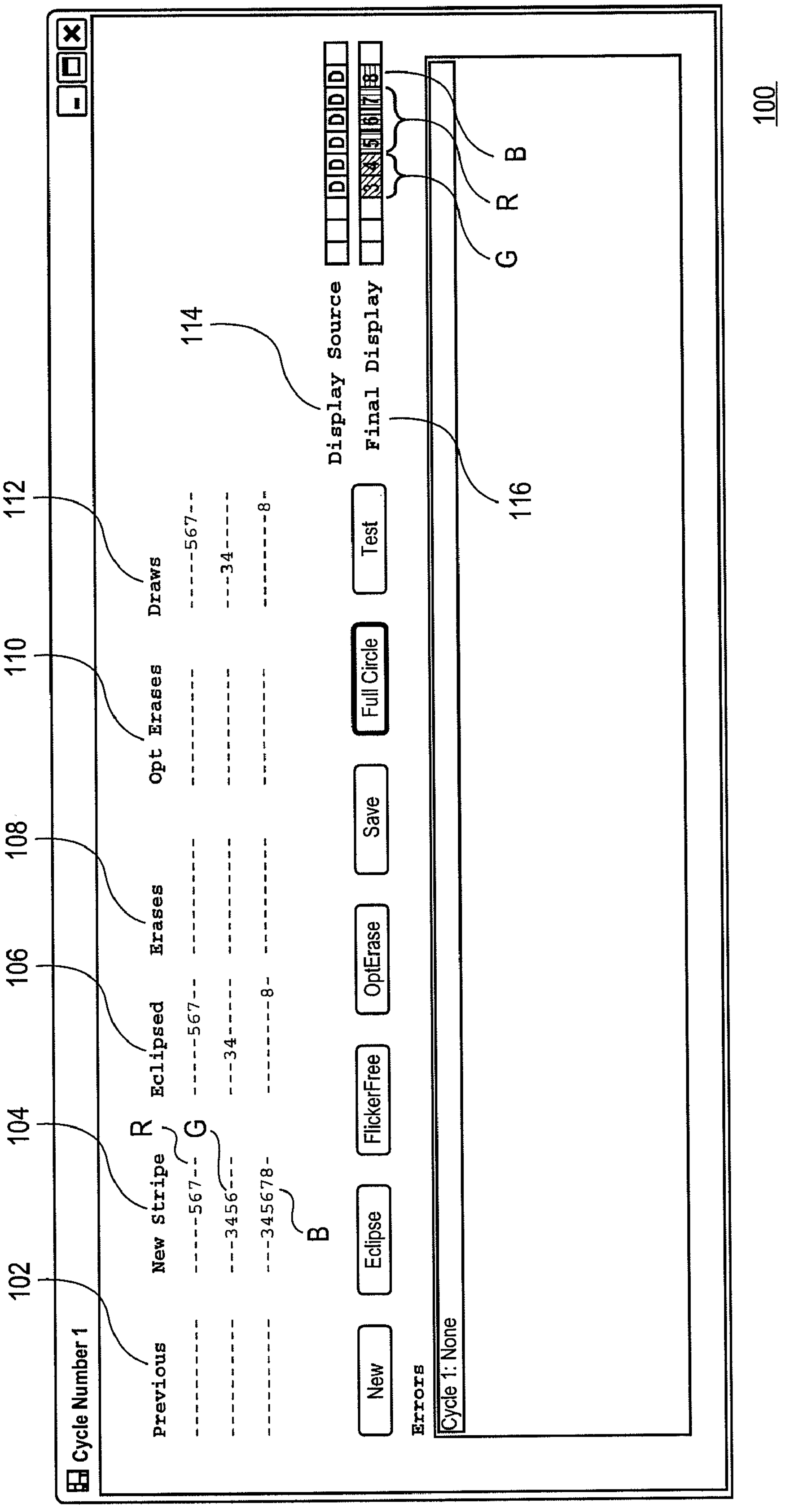
FIGS. 2-5 are screen displays of the invention through 8 cycles of a program.

The invention will now be described with reference to the drawing figures, in which like reference numerals refer to like parts throughout. An embodiment in accordance with the invention provides a method of waveform drawing, including generating a plurality of waveforms with certain waveforms being in the same space for display, eclipsing the waveforms in a rank order and storing in an eclipsed list, a plurality of drawing points with the results of eclipsing the waveforms in the rank order, performing a method of reducing flicker on the displayed image from the data outputted from the eclipsing of the waveforms in rank order, optimizing an erasure list from the data outputted from performing the method of reducing flicker, the erasure list and a draw list including the results of the method of reducing flicker, and copying from the eclipsed list to a predecessor list, the predecessor list including drawing units representing vertical stripes at a given x-axis position.

When a number of waveforms are drawn in a shared display area, there can be overlaps of drawing and erasing of one waveform over another. This invention optimizes the drawing of multiple waveforms by the following. First, by resolving the precedence of the superior waveforms (those whose pixels are eclipsed by the superior waveform), modifying the subordinate waveforms to remove unnecessary drawing. Then resolving erasures of previously displayed pixels to avoid erasing pixels which are still needed by the current drawing cycle and then resolving the precedence of erasures such that no erasures occur in areas occupied by more superior waveforms.

The present invention permits any number of waveforms to be drawn in the same display space, with proper precedence of one waveform over another, and with no redundant drawing or erasing steps.

Referring to FIG. 1, there is shown a system for drawing a waveform. The system 10 includes a waveform drawing routine 12, which can be a part of a larger software program 14, a storage medium 16, a processor 18, and a display 20. The software program may be stored on the storage medium 16 that is, for example, a diskette, a hard disk drive, a compact disc (CD), DVD (digital versatile disc or digital video disc), flash drive, a random access memory device and/or a read-only memory device.

The display 20 includes a grid of pixels 22 where a waveform 24 may be displayed. The waveform 24 is the result of a series of lines that have been plotted, such as line 26. Each line has a high end point and a low end point, and is located at a position along an axis. For example, the high end point of line 26, which corresponds to element 23, is a position two on the Y-axis and the low end point which corresponds to element 25 is zero position as seen in the Y-axis, and line 26 is drawn at position five on the X-axis. Together, the sums of all the lines, shown on the display in FIG. 1, which are at positions zero through five along the X-axis, form the resultant waveform 24.

Analyzing waveforms such as vehicle waveforms that are captured digitally often requires complex passes of the array of digital values to determine the location of the average value of the waveform or portions of the waveform, as well as the location of the peak and lowest point of the waveform, and significant regions of the waveform.

The complex passes of the array of digital values cause the use of a large amount of resources, including the need of increased processing power and increased memory. If the processor is too slow or has too little memory to use, the analysis of the waveform is slowed. The slower analysis can cause increased delay in getting the results to the user or even a sluggish performance to inhibit the use of the analysis. Therefore, if an application is time intensive in its analysis, such increased load will have an adverse effect on the performance of a device.

For each possible vertical position of the individual point in a digital waveform, a data cell is maintained which receives a count of the number of points that were encountered at that position during a horizontal sweep of the waveform array. This array of all vertical positions can then be analyzed to determine the peak, the lowest point, the average, and other significant values related to the waveform. Additionally, since the location of the cell in the array of vertical positions corresponds to the value of the waveform at the vertical position, simple mathematics over the vertical array can be performed to yield totals, for example, total energy, represented by the waveform.

The invention requires less processing than conventional methods of waveform analysis. The reduced processing equates to less programming and greater efficiency especially for embedded devices including special purpose computing systems. The reduced processing also provides for a lower load on the processor, thereby allowing a system to have a processor with less power, thus accommodating also a reduction in the power consumption. The reduced power consumption is especially helpful in embedded devices that have a limited power supply such as a secondary battery or other portable power supply.

The technique of the invention with regard to the waveform processing steps is explained below in detail with reference to the drawings. The steps shown are examples and should not be limited to the order shown. Further, some steps can be removed or additional steps can be added to the example shown below.

The following includes certain assumptions that are made with regard to the technique of the invention. The invention includes a software module or processing unit for optimizing waveforms prior to being displayed, to reduce the display processing operations and to reduce flicker. A user of the software module will present the module with waveforms to be optimized. The user will then be responsible for actually causing the waveforms to be drawn on the display.

Since waveforms drawn on a digital display are actually composed of a series of adjacent vertical 'stripes', some of the optimizations described herein pertain to the optimization of each of these 'stripes', in relation to its predecessor vertical 'stripe' (i.e., the pixels of the same color which were drawn to the same x-axis position of the display in a previous drawing cycle). These are derived from the previous U.S. Pat. No. 7,079,143 "Waveform Drawing System and Method".

The features described here resolve the issues regarding multiple waveforms sharing a drawing surface. The additional steps of drawing and erasing have been removed to an optimized technique of drawing in the same space.

The waveform vertical 'stripes' are assumed to be represented by a pair of values, or drawing pair, representing the high end point and low end point of the pixels to be plotted on the display in a single x-axis position. For ease of reference, here, they will be termed Y1 (low end point) and Y2 (high end point). In addition, the waveform's rank, or precedence among all waveforms, is retained with each drawing pair, such that each vertical 'stripe' is described by rank, Y1, Y2.

Each rank can be represented by a different color on the display, at the user's discretion. Other schemes of representing the rank can be used including, for example, embedded information that is discernable by a computer. Additionally, shading can be used to display the rank. This entire set of values for a single vertical 'stripe' will be termed a drawing unit. These assumptions are made only for the ease of showing an example of the invention and for clarification purposes.

The lists of the drawing units are shown as follows. In an embodiment of the invention, drawing-units are maintained in lists, where they may be modified, expanded, or replaced as the logic requires. It is possible to organize the lists of drawing pairs (or units) in numerous ways depending on the needs or desires of the implementer or user. One embodiment contains the following lists of drawing units.

Referring to FIGS. 2-5, first, there can be a predecessor list 102. The predecessor list is a list of drawing units representing the vertical 'stripes' that are currently visible on the display at the given x-axis position. This list is a copy of the previous drawing cycle's Eclipsed list 106 described below. As seen in the drawings of FIGS. 2-5, this list of the predecessor list is shown under the title "Previous" 102 in the display 100.

Another list that can be included is the Successor list 104. The successor list 104, as seen in the display 100, is a list of drawing units containing the newly arrived drawing request from the user. The Successor list 104 is shown under the label of "New Stripe".

An eclipsed list 106 can also be included. The Eclipsed list 106 is a list of drawing points containing the results of performing an eclipsing operation on the Successor List. The Eclipsing operation is described in more detail below. The drawings are labeled with "Eclipsed" for the Eclipsed list 106.

An Erase list 108 and a draw list 112 can also be included. The erase 108 and drawl 12 lists contain the results of performing a 'Flicker-Free' technique, as shown in the patent entitled "Waveform Drawing System and Method" to the Predecessor List 102 and the Eclipsed List 106.

The "Flicker-Free" technique can include, for example, a method for waveform drawing to reduce waveform flicker arising from drawing a successor image after a drawn predecessor image, including receiving an array of predecessor image data points, the array of predecessor image data points containing a predecessor high end point and a predecessor low end point, defining an upper bound of a predecessor line and a lower bound of the predecessor line, respectively, wherein each element of a domain of the predecessor array corresponds to a horizontal displacement and each element of a range of the predecessor array corresponds to a vertical displacement. Additionally there can be in the "Flicker-Free" method, receiving an array of successor image data points, the array of successor image data points containing a successor high end point and a successor low end point, defining an upper bound of a successor line and a lower bound of the successor line, respectively, wherein each element of a domain of the successor array corresponds to a horizontal displacement and each element of a range of the successor array corresponds to a vertical displacement. Further, there is a comparing of the high end point and low end point of the successor line to the high end point and low end point of the predecessor line, respectively. Additionally, there is maintaining portions of the predecessor line on a display that are determined in the comparing step to intersect with the successor line.

As seen in FIGS. 2-5, the erase list 108 and the draw list 112 are shown under the labels of "Erases" and "Draws," respectively. As mentioned above, the "Flicker-Free" technique results are shown by the erase list 108 and the draw list 112.

Another list can be an optimized erasure list 110. The optimized erasure list contains the results of optimizing the Erase List 108, such that no erasure operates on any points contained in the Draw List 112. This optimization employs another type of eclipsing routine as shown below. Please note that in FIGS. 2-5, the optimized erasure list 110 is shown under the label "Opt Erases."

Figure 6:
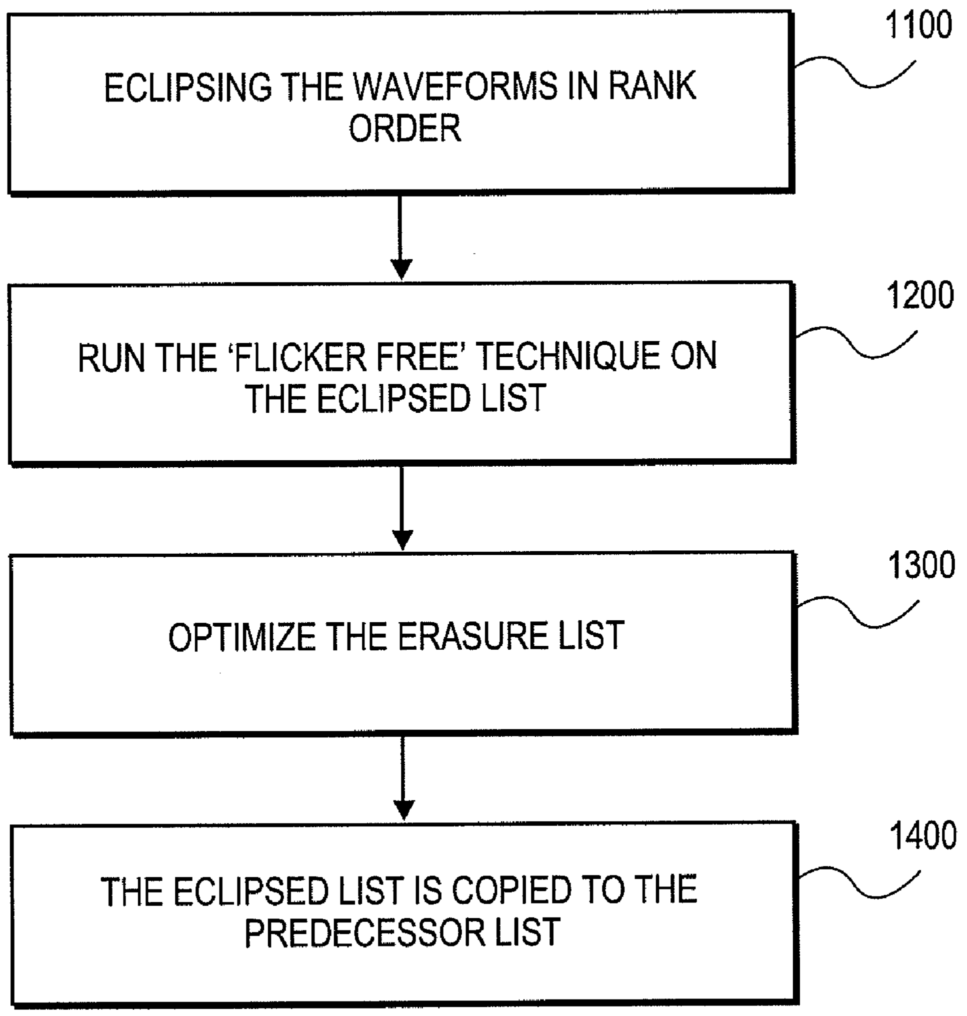
FIG. 6 is a flow diagram of the technique of the invention.

Referring to FIG. 6, the following description includes the steps of the invention. The steps shown are not limited as to the order or to the particular steps. A different order can be performed, or additional steps can be added and certain steps can be removed.

The first step can include Eclipsing the waveforms in Rank order 1100. When the user presents the invention with multiple waveforms to draw, a rank will have been assigned by the user to each, depending on which waveform is to obscure the others if they occupy the same display area. The ranking can be done manually or automatically according to a predetermined set of variables or instructions. For example, the user or set of instructions may decide that the Red waveform is of higher rank than the Green waveform, and thus the Red waveform can obscure the Green waveform, which in turn is of higher rank than a Blue waveform, and thus can obscure the Blue waveform.

Performing the eclipsing operation can reduce the number of drawing operations for the lower-ranked waveforms significantly, even to the extent of requiring no drawing at all in the case where the lower-ranked waveform is entirely obscured by a higher-ranked waveform.

Figure 7:
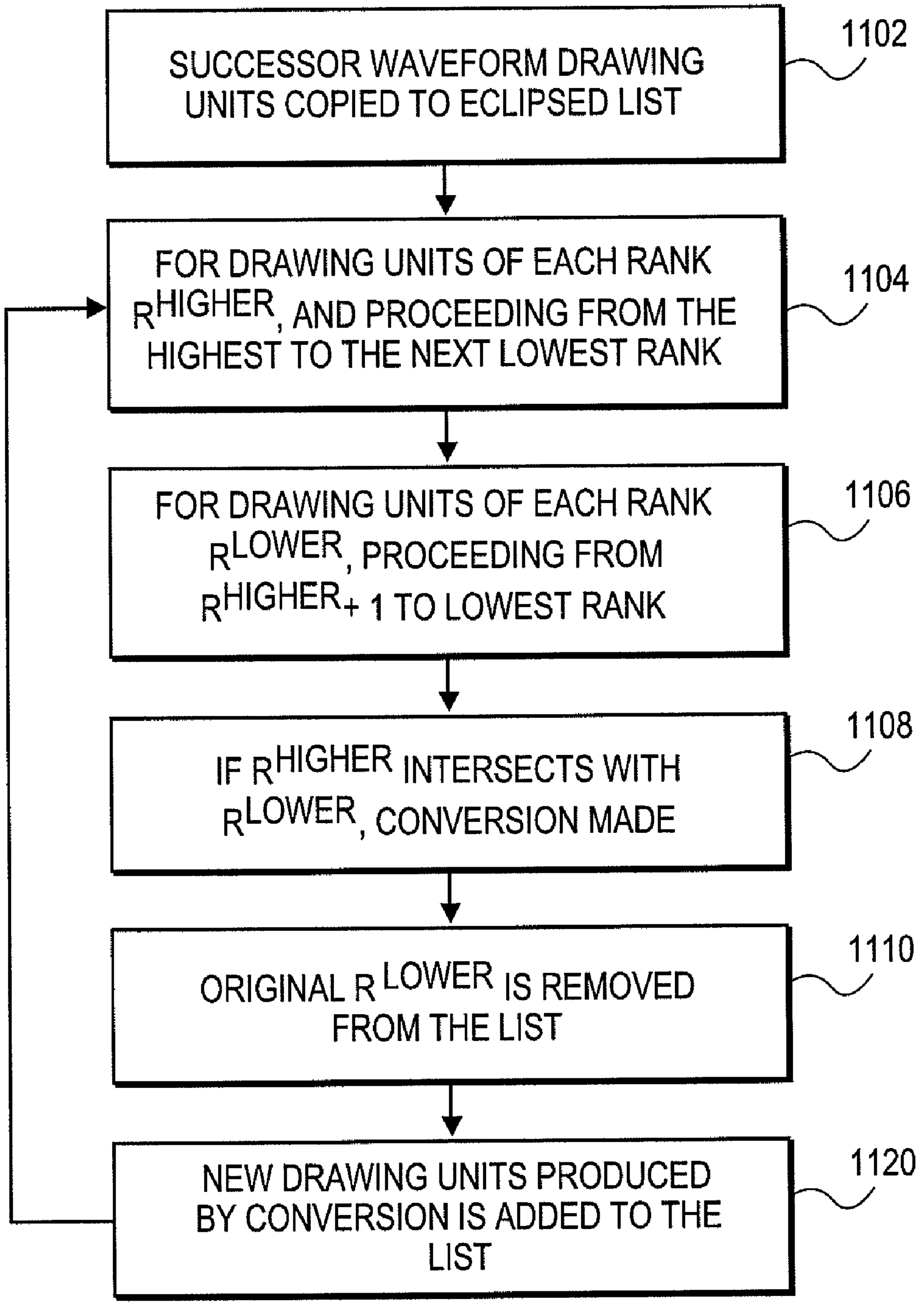
FIG. 7 is a flow diagram of the eclipsing step of FIG. 6.

The eclipsing of the waveforms in rank order 1100 can be further described in the steps shown in FIG. 7. All Successor (i.e., new) waveform drawing units (as shown in the successor list 104) are copied to the Eclipsed List 106 (step 1102).

This is done in an embodiment of the invention, although alternatively, the eclipsing optimizations can just as well be performed on the Successor List, since it has no function other than to receive new drawing units from the user. Additional alternative steps can also be performed that can show the same result.

For the drawing units of each rank, $R^{-Higher}$, then the technique includes the proceeding from the highest to the next-to-lowest rank (step 1104). Then, for the drawing units of each rank $R^{-Lower}$, there is a proceeding from $R^{-Higher}+1$ to the lowest rank (step 1106).

If $R^{-Higher}$ intersects with $R^{-Lower}$, $R^{-Lower}$ is converted to zero, one, or two new drawing units, as appropriate, to draw that portion of $R^{-Lower}$ which will not be obscured by $R^{-Higher}$ (step 1108). For the purposes of examples, FIGS. 2-5, have all drawing units for each Rank/Color, combined into single lines for each rank.

The original $R^{-Lower}$ is removed from the list (step 1110) and any new drawing units produced by the conversion step (step 1108) are added to the list (step 1112). This operation is repeated until all drawing units have been processed.

Referring back to FIG. 6, the next step is to run the 'Flicker Free' algorithm on the Eclipsed List (step 1200). For each drawing unit in the Eclipsed List, the technique applies to the algorithm from "Waveform Drawing System And Method" to the elements of the Eclipsed List 106 and the Predecessor List 102 to yield a list of drawing units representing erasures (the Erase List 108) and a list of drawing units representing new drawing to be done (the Draw List 112).

The next step would be to optimize the Erasure List 108 (step 1300). Because Erase List 108 drawing units of one rank may intersect Draw List 112 drawing units of another rank, the Erase List must be processed such that no Erase List 108 drawing unit intersects with any Draw List 112 drawing unit.

Figure 8:
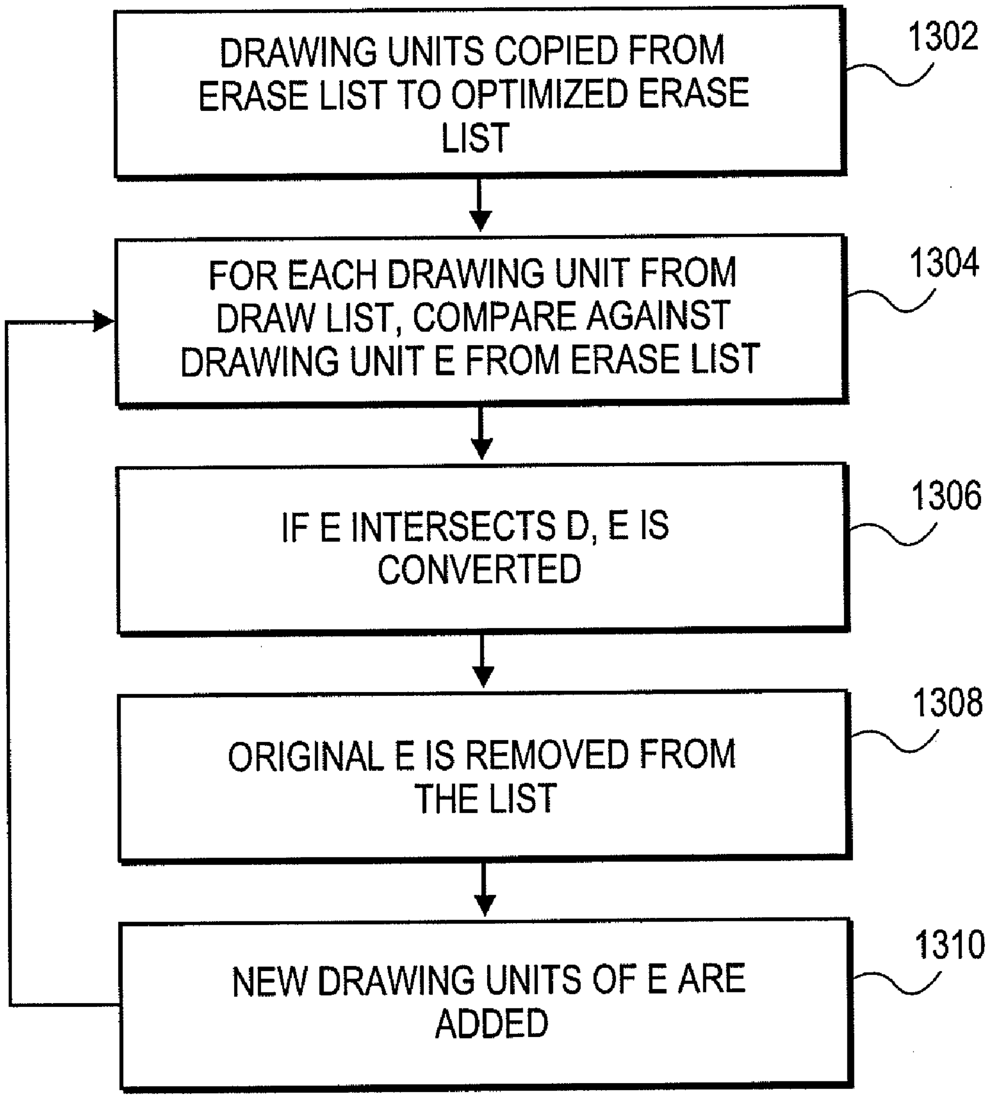
FIG. 8 is a flow diagram of the optimization step of FIG. 6.

Referring to FIG. 8, the optimization of the Erasure List (step 1300) can be further described. First, all drawing units are copied from the Erase List 108 to the Optimized Erase List 110 (step 1302). This is done in the embodiment of the invention, although alternatively, the optimizations can just as well be performed on the Erase List 108 itself, since it has no function other than to receive new drawing units from the step of running the "Flicker Free" technique on the eclipse list.

For each drawing unit D from the Draw List, there is a comparison made against each drawing unit E from the Erase List as follows (step 1304). If E intersects with D, then E is converted to zero, one, or two new drawing units, as appropriate, to erase that portion of E which will not intersect D (step 1306). In FIGS. 2-5, all the drawing units for each Rank/Color have been combined into single lines for each rank.

The original E is then removed from the list (step 1308) and any new drawing units $E^1$ and possibly $E^2$ are added (step 1304). This operation is repeated until all drawing units in the Optimized Erase List have been processed.

Referring back to FIG. 6, the Eclipsed List (step 1400) is copied to the Predecessor List (104). In this embodiment of this is the fourth step after optimizing the erasure list 1300, although alternatively, it can occur as the third step before the optimize the erasure list step 1300, since the Predecessor List 104 is of no further use after the 'Flicker Free' operations of Step 1200 are complete.

Referring back to FIGS. 2-5, a sequence of 8 cycles are shown in the figures, showing the steps of the invention, beginning from an empty predecessor list 102, as shown particularly in FIG. 2. The examples use three waveforms of Red, Green and Blue as shown with the different shades in the drawings. Red is ranking 1, then Green is rank 2 and Blue is ranking 3.

Figure 5:
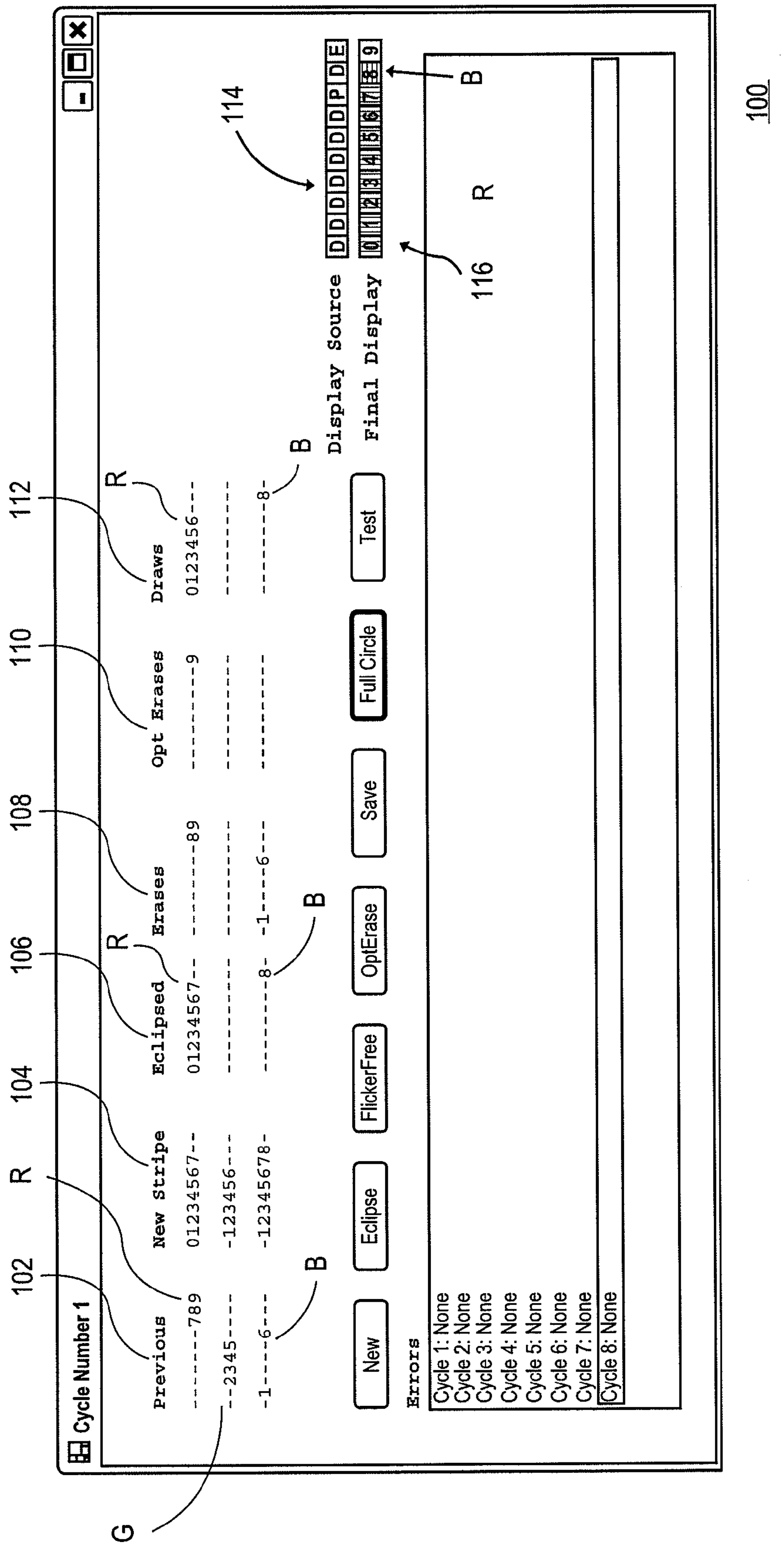

Referring to FIG. 5, an example of the predecessor list is shown. In the eighth cycle of the program, the red (R) waveform occupies Y-axis 7, 8 and 9. The Green (G) waveform occupies the Y-axis positions 2, 3, 4 and 5. The Blue (B) waveform occupies Y-axis positions 1 and 6.

Figure 9:
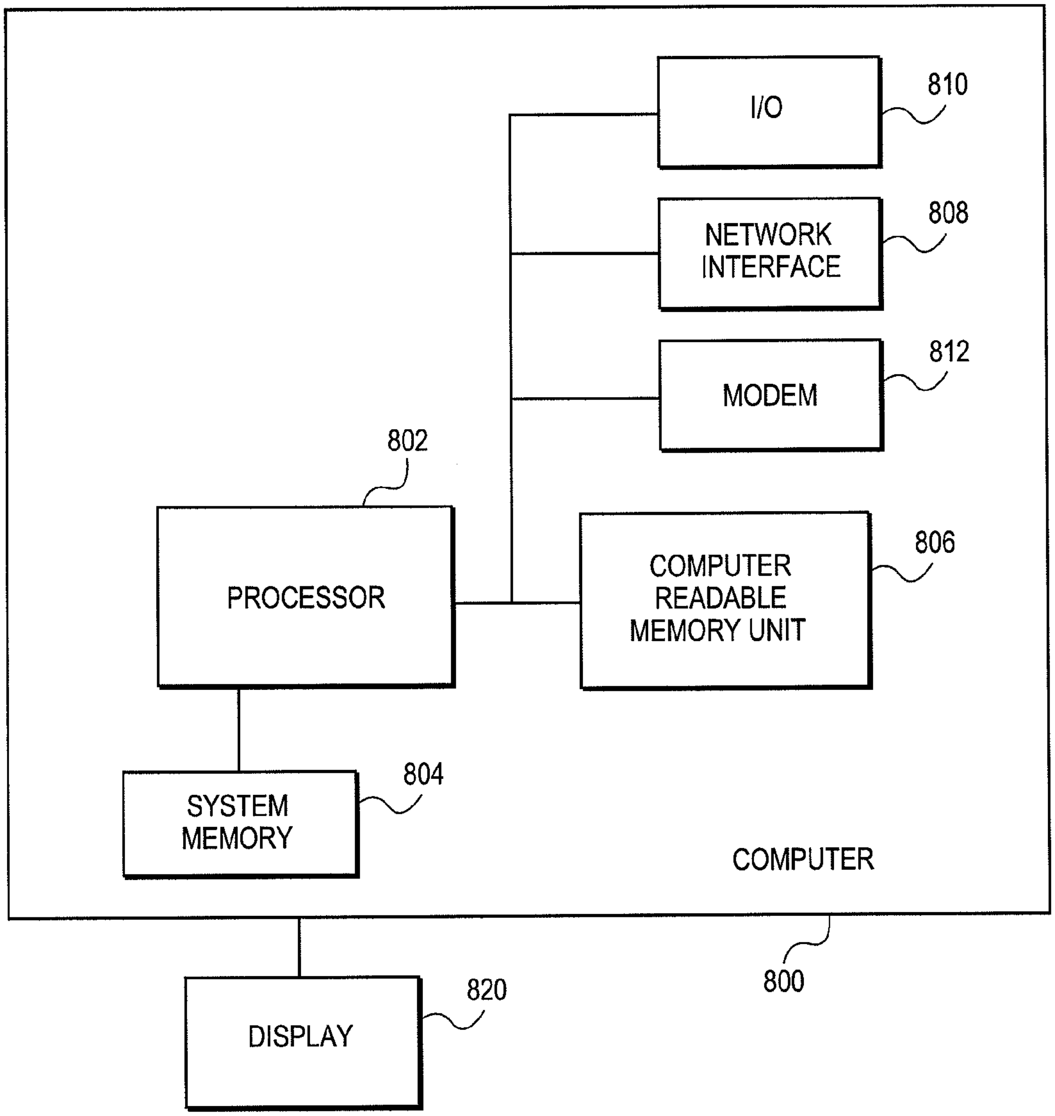
FIG. 9 illustrates an exemplary computer-readable carrier in an exemplary computer.

The successor list 104 contains the intended new waveforms to be drawn. As seen in FIG. 9, the positions overlap the same area. Then moving to the Eclipsed list 106, the highest ranked Red (R) has entirely eclipsed the Green (G) waveform, and left only a single pixel of the Blue (B) waveform as seen in the eclipsed list 106. The erase list 108 and the draw list 112 results from the optimizing of the eclipsed list 106 against the predecessor list 102. Further, the optimized erase list 110 shows the result of optimizing the erase list 108 against the draw list 112, to show a single Red (R) waveform at the $9^{th}$ position.

The Examples in FIGS. 2-5 show resulting screen pixels after the Draw List 112 and Optimized Erase List 110 have been drawn by the user of the invention. The Optimized Erase List 110 represents pixels that will be drawn in the color of the 'background' of the display, whatever the user intends. In this example, Display Source 114 represents from which list the pixel was drawn: D=Draw List; P=Predecessor List; E=Optimized Erase List; and (none) No pixels drawn. The final display 116 shows that the corresponding colors for the positions with red being at 0-7, and blue at 8. The final display 116 corresponds to the display source 114 as shown in FIGS. 2-5.

Figure 3:
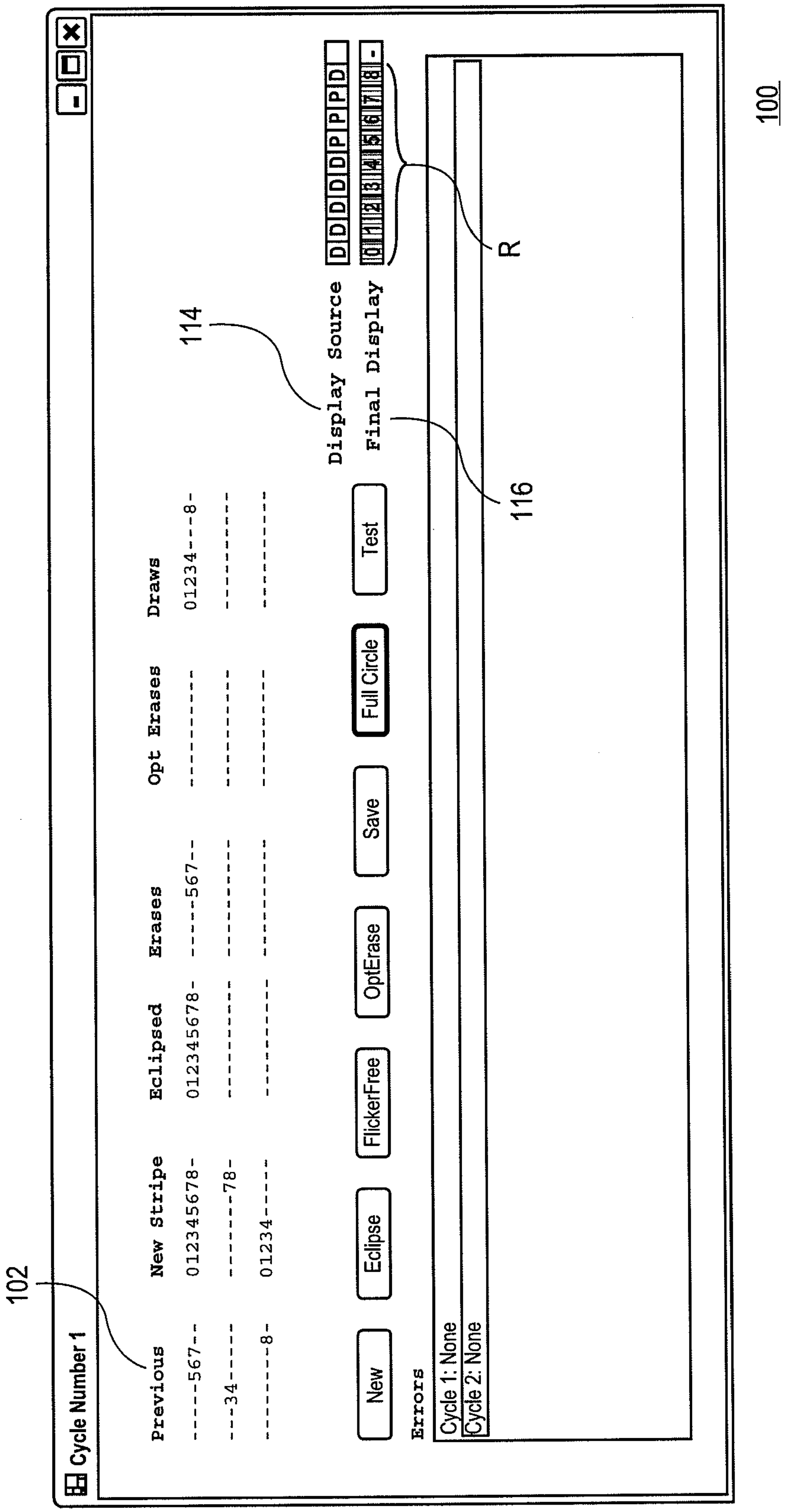
Figure 4:
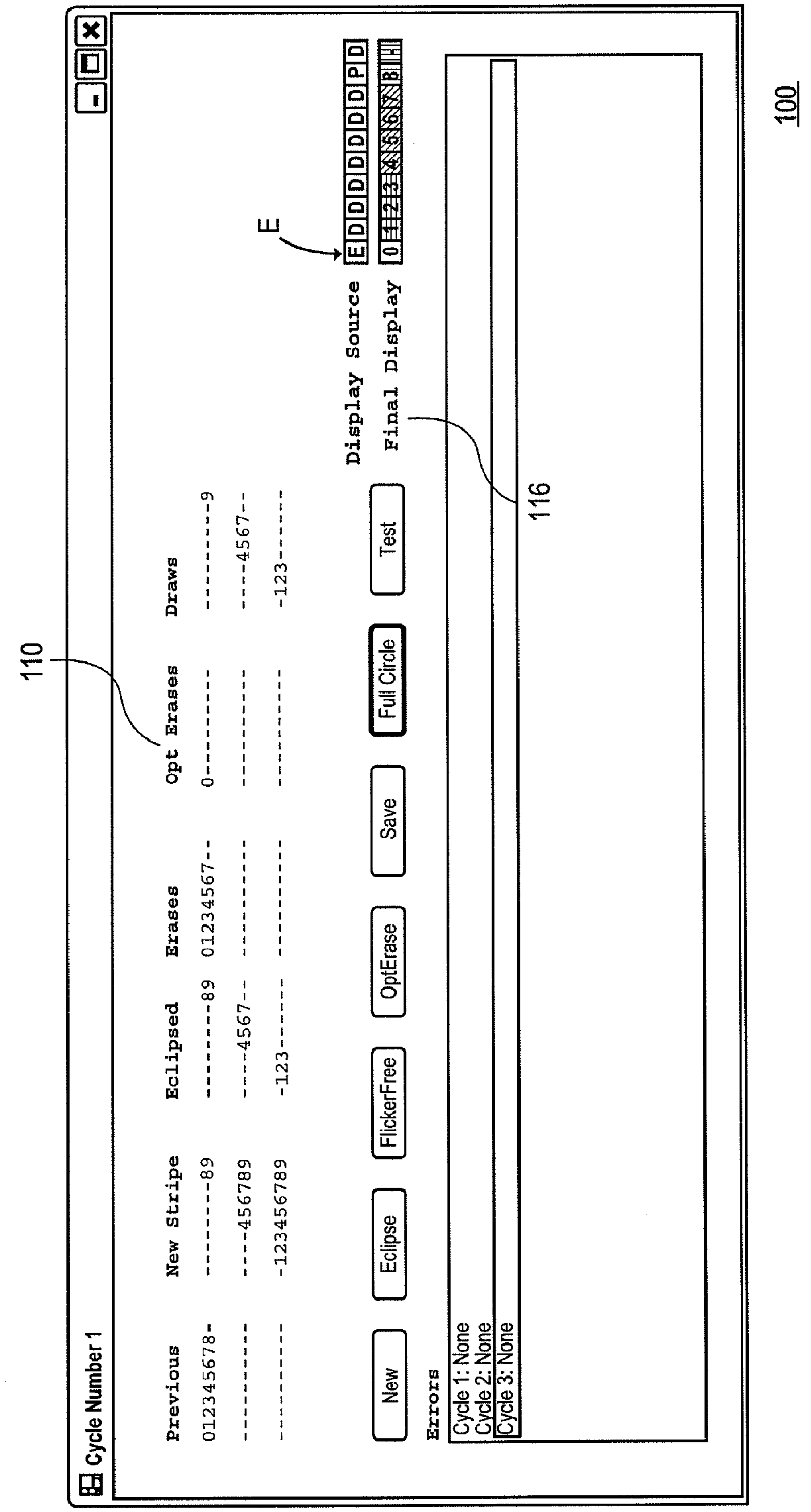

Referring back to FIG. 2, the final display 116 includes a green at positions 3, 4, red at 5, 6, 7, and blue at 8. All the drawn waveforms are sourced from the draw list 112. In FIG. 3, however, positions 5, 6 and 7 originate from the predecessor list (P) 102 have the color red (R). In cycle 3, of FIG. 4, the optimized erase list (E) 110 is used to give no color at position zero in the final display 116.

A method for image drawing, in accordance with the present invention, avoids redundant plotting of pixels and erasures when multiple waveforms are in the same space. Accordingly, a method for image drawing, in accordance with the present invention, involves fewer steps, and is less complex than some conventional methods of waveform drawing.

The invention can be realized as computer-executable instructions in computer-readable media. The computer-readable media includes all possible kinds of media in which computer-readable data is stored or included or can include any type of data that can be read by a computer or a processing unit. The computer-readable media include for example and not limited to storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The invention can include the computer-readable medium having stored thereon a data structure including a plurality of fields containing data representing the techniques of the invention.

Referring to FIG. 9, an example of a computer, but not limited to this example of the computer 800, that can read computer readable media that includes computer-executable instructions of the invention. The computer 800 includes a processor 802 that uses the system memory 804 and a computer readable memory device 806 that includes certain computer readable recording media. A system bus connects the processor 802 to a network interface 808, modem 812 or other interface that accommodates a connection to another computer or network such as the Internet. The system bus may also include an input and output (I/O) interface 810 that accommodate connection to a variety of other devices. Furthermore, the computer 800 can output through, for example, the I/O 810, data for display on a display device 820.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method waveform drawing on a display, comprising:

generating a plurality of waveforms by a processor with certain waveforms being in the same space for eclipsing the waveforms in a rank order and storing a plurality of drawings points with the results of the eclipsing of the waveforms in rank order in art eclipsed list;

performing a reduction of flicker on the display from the data outputted from the eclipsing of the waveforms in rank order, an erasure list mad a draw list including the results of the reduction of flicker;

copying from the eclipsed list, to a predecessor list the predecessor list including drawing units representing vertical stripes at a given x-axis position after performing the reducing of flicker on the display;

optimizing the erasure list from the data outputted from performing the reduction of flicker mad storing in an optimized erasure list; and drawing waveforms on the display including multiple waveforms in the same space according to at least one of the eclipsed list, erasure list, draw list, predecessor list and the optimized erasure list, wherein optimizing the erasure list further comprises copying drawing units from the erasure list to an optimized erase list, the optimized erase list including data where no erasure operates on any points contained in the draw list.

* * * * *